United States Patent
Nishide

[19]

[11] Patent Number: 5,979,400
[45] Date of Patent: Nov. 9, 1999

[54] FUEL INJECTION CONTROL METHOD AND SYSTEM IN A DIRECT INJECTION TYPE GASOLINE INTERNAL COMBUSTION ENGINE

[75] Inventor: Hiroto Nishide, Kanagawa-ken, Japan

[73] Assignee: Nissan Motor Co., Ltd., Kanagawa-ken, Japan

[21] Appl. No.: 08/926,490

[22] Filed: Sep. 10, 1997

[30] Foreign Application Priority Data

Sep. 10, 1996  [JP]  Japan .................................... 8-239132

[51] Int. Cl.[6] ....................................................... F02B 5/00
[52] U.S. Cl. ........................................... 123/305; 123/294
[58] Field of Search ..................................... 123/305, 294

[56] References Cited

U.S. PATENT DOCUMENTS

| | | | |
|---|---|---|---|
| 5,078,107 | 1/1992 | Morikawa ................................ | 123/305 |
| 5,086,737 | 2/1992 | Watanabe et al. ...................... | 123/305 |
| 5,150,692 | 9/1992 | Trombley et al. . | |
| 5,186,138 | 2/1993 | Hashimoto . | |
| 5,222,481 | 6/1993 | Morikawa ................................ | 123/435 |
| 5,485,822 | 1/1996 | Hirose et al. . | |
| 5,598,817 | 2/1997 | Igarashi et al. . | |
| 5,692,474 | 12/1997 | Yamauchi et al. ...................... | 123/425 |
| 5,718,203 | 2/1998 | Shimada et al. ........................ | 123/305 |

FOREIGN PATENT DOCUMENTS

| | | |
|---|---|---|
| 0527659 | 8/1992 | European Pat. Off. . |
| 0684374A2 | 8/1992 | European Pat. Off. . |
| 62-237057 | 10/1987 | Japan . |
| 2-20754 | 2/1990 | Japan . |
| 2-20755 | 2/1990 | Japan . |

*Primary Examiner*—John Kwon
*Attorney, Agent, or Firm*—McDermott, Will & Emery

[57] ABSTRACT

In a fuel injection system of a direct injection type gasoline internal combustion engine, which is equipped with a fuel injection valve for directly injecting fuel into a combustion chamber of each cylinder, and which is arranged to control period of fuel injection and start-up timing of injection of the fuel injection valve according to operational conditions of an engine, the system is arranged to compulsively stop the fuel injection of the fuel injection valve when the pressure in a cylinder exceeds the pressure of the fuel supplied to the fuel injection valve.

17 Claims, 5 Drawing Sheets

FUEL INJECTION CONTROL METHOD AND SYSTEM IN A DIRECT INJECTION TYPE GASOLINE INTERNAL COMBUSTION ENGINE

The contents of Application No. TOKUGANHEI 8-239132, with a filing date of Sep. 10, 1996, in Japan are hereby incorporated by reference.

BACKGROUND OF THE INVENTION

1. Technical Field of the Invention The present invention relates to a fuel injection control method and a system in a direct injection type gasoline internal combustion engine, and more particularly, relates to, in a direct injection type gasoline internal combustion engine with a fuel injection valve directly injecting fuel into a combustion chamber of each cylinder, the technique for controlling the injection period of the fuel injection valve.

2. Prior Art Previously, as a direct injection type gasoline internal combustion engine, engines disclosed in JP U HEI 2-20755, JP U HEI 2-20754 and the like, were well known.

In the engine of JP U HEI 2-20755, the period of injection is arranged to be compensated for on the basis of the differential pressure between the fuel pressure and the pressure in a cylinder, and further, the timing of injection is arranged to be compensated according to the fluctuation of the period of injection.

Moreover, in the engine of JP U HEI 2-20754, it is arranged that the injection quantity is determined by finding the real air quantity from the pressure in a cylinder, and that the period of injection corresponding to the injection quantity is compensated on the basis of the differential pressure between the fuel pressure and the pressure in a cylinder and the timing of injection is compensated according to the fluctuation of the period of injection.

In the direct injection type gasoline internal combustion engine, the period of injection is controlled by measuring the time since the start-up timing of injection. However, there is a possibility that the crank angle position of the finishing of injection is largely delayed, and consequently, the injection control is performed at the moment the pressure in a cylinder is higher than the fuel pressure and a back flow occurs at a fuel injection valve.

For example, in a start-up at low temperature, the required injection quantity is large, and further, the fuel pressure is low just after the start-up in a case where an engine drive type high pressure fuel pump is used, so that the period of injection complying with the required injection quantity becomes long. However, there is a possibility that if the rotation speed rises rapidly after the start-up of injection, the crank angle position of the finishing of injection slips into the latter period of a compression stroke because the period of injection and the timing of injection are left to be values suitable for the state of low speed rotation before rising of the rotation speed, and consequently, a state where the injection valve is controlled to open, is continued even when the pressure in a cylinder has come to be higher than the fuel pressure.

Furthermore, in a case where the period of injection is arranged to be subjected to a feedback control on the basis of the fuel pressure detected by a fuel pressure sensor, the period of injection is excessively compensated if the fuel pressure is detected to be lower than the real pressure because of a breakdown of the fuel pressure sensor, and further, in a case where a fuel pump is in trouble and the specified high pressure cannot be obtained, the period of injection is increasingly compensated by the feedback control, and consequently, there is a possibility that the crank angle position of the finishing of injection is delayed, and a state where the injection valve is controlled to open, is continued even when the pressure in a cylinder has come to be higher than the fuel pressure.

SUMMARY OF THE INVENTION

The present invention is made in view of the above problems, and has an object to make it possible that in a direct injection type gasoline internal combustion engine arranged to control the injection quantity on the basis of the period of injection, continuation of the injection even at a crank angle position where the pressure in a cylinder is higher than the fuel pressure is prevented so as not to previously occur a back flow at a fuel injection valve.

In order to achieve the above object, there is provided a fuel injection control system in a direct injection type gasoline internal combustion engine, comprising: a fuel injection valve for directly injecting fuel into a combustion chamber of each cylinder; and an injection control means which controls the period of fuel injection and the start-up timing of injection of the fuel injection valve according to operational conditions of an engine, and which compulsively stops the fuel injection of the fuel injection valve when the pressure in cylinder becomes higher than the pressure of the fuel supplied to the fuel injection valve.

According to such structure, when the pressure in a cylinder becomes higher than the fuel pressure, the fuel injection is compulsively stopped without waiting the elapse of the calculated injection period, and consequently, the control to open an injection valve is avoided in a state where the pressure in a cylinder may become higher than the fuel pressure to create a back flow.

In order to achieve the above object, there is provided a fuel injection control system in a direct injection type gasoline internal combustion engine, comprising: a fuel injection valve for directly injecting fuel into a combustion chamber of each cylinder; a fuel injection control means for controlling the period of fuel injection and the start-up timing of injection of the fuel injection valve according to operational conditions of an engine; a limit crank angle position setting means for setting a crank angle before ignition as a limit crank angle position for compulsively stopping the fuel injection of the fuel injection valve; a limit crank angle position detecting means for detecting the limit crank angle position set by the limit crank angle position setting means, for every cylinder; and a fuel injection stopping means for compulsively stopping, when a limit crank angle position is detected by the limit crank angle position detecting means, the fuel injection of the fuel injection valve of the corresponding cylinder.

According to such structure, when a limit crank angle position is detected on the basis of a detection signal of a crank angle sensor or the like, the fuel injection by the fuel injection valve (control to open the fuel injection valve) of the cylinder, is compulsively stopped, and even if it is before the elapse of the calculated injection period, the fuel injection is stopped at the crank angle positions after that. Accordingly, the injection in a state where the pressure in a cylinder is higher than the fuel pressure, can easily and surely be avoided.

In a preferred embodiment of the present invention, the limit crank angle position setting means sets a constant value as the limit crank angle position.

If such structure is made in a case where the fuel pressure can be taken as a nearly constant pressure, the limit crank angle position can easily be set.

In a preferred embodiment of the present invention, the limit crank angle position setting means sets 40° to 80° before top dead center as the constant value.

In a preferred embodiment of the present invention, the limit crank angle position setting means sets the limit crank angle position to be variable according to the pressure of the fuel supplied to the fuel injection valve.

According to such structure, the pressure in a cylinder exceeds the fuel pressure at a more advanced crank angle position during a compression stroke at a lower fuel pressure. Consequently, by more advancing the limit crank angle position at a lower fuel pressure, a crank angle position where the pressure in a cylinder is higher than the fuel pressure, can be set as the limit crank angle position even if the fuel pressure fluctuates. Accordingly, even if the fuel pressure fluctuates, a moment the pressure in a cylinder exceeds the fuel pressure, can be specified with high precision so that the injection by the fuel injection valve may be stopped at a proper moment.

In a preferred embodiment of the present invention, the limit crank angle position setting means sets the limit crank angle position to be variable according to the temperature of an engine.

According to such structure, in a start-up at low temperature where there is a high possibility that the finishing of injection slips into the moment the pressure in a cylinder exceeds the fuel pressure, the limit crank angle position can be advanced.

In a preferred embodiment of the present invention, the limit crank angle position setting means sets the limit crank angle position to be variable according to the load of an engine and the rotational speed of an engine.

According to such structure, since the pressure in a cylinder during a compression stroke changes according to the load of an engine and the rotational speed of an engine, the limit crank angle position can be set according to the change of the pressure in a cylinder depending on the change of the operational conditions of an engine.

In a preferred embodiment of the present invention, the feature is that the injection control means switches the start-up timing of injection of the fuel injection valve to either of a moment during an intake stroke or a moment during a compression stroke according to the operational conditions of an engine, and that the limit crank angle position setting means switches and sets the limit crank angle position according to whether the start-up timing of injection is during an intake stroke or during a compression stroke.

In a case where the start-up timing of injection is during a compression stroke, there is a possibility that if the limit crank angle position is set with a comparatively large margin (if the limit crank angle position is set at a comparatively early moment), ensuring of the required injection quantity becomes difficult, but in a case where the start-up timing of injection is during an intake strike, the start-up timing of injection is early, so that the injection quantity can be ensured even if the limit crank angle position is set with a comparatively large margin, and consequently, by switching the limit crank angle position according to the start-up timing of injection, the limit crank angle position can be set with a maximum margin for each timing of injection, while ensuring the injection quantity. That is, a proper limit crank angle position can be set according to switching of the start-up timing of injection, so that ensuring of the injection quantity and proper control to stop the injection may stand together.

In order to achieve the above object, there is provided a fuel injection control system for a multi-cylinder internal combustion engine of direct injection type, comprising: a fuel injection valve disposed in a combustion chamber of each engine cylinder; a sensor for generating an engine operating condition indicative signal; a control unit, responsive to the sensor signal, for calculating a period of injection and a start-up timing thereof and controlling the injection valve based on the calculated injection period and start-up timing; a limit crank angle position setting unit for setting a limit crank angle position to stop the fuel injection; a limit crank angle position detecting unit for detecting whether the limit crank angle position has been reached while fuel is being injected, and generating a detection signal; and a fuel injection stopping unit, upon receipt of the detection signal, for immediately stopping injection process prior to the elapse the injection period.

In a preferred embodiment of the present invention, the limit crank angle position is set for each cylinder so that the fuel injection stopping operation is performed independently for each cylinder.

In a preferred embodiment of the present invention, the sensor is an engine speed detecting sensor.

In a preferred embodiment of the present invention, the limit crank angle is calculated for each cylinder after the fuel injection period and start-up timing control has been put in operation for the cylinder.

In order to achieve the above object, there is provided a fuel injection control system for a multi-cylinder internal combustion engine of direct injection type, comprising: a fuel injection valve disposed in a combustion chamber of each engine cylinder; a sensor for generating an engine operating condition indicative signal; a control unit, responsive to the sensor signal, for calculating a period of injection and a start-up timing thereof relative to a reference position with respect to each cylinder and controlling the injection valve according to the calculated injection period and start-up timing for each cylinder; a limit crank angle position setting unit for setting a limit crank angle position at which the fuel injection is stopped; a limit crank angle position detecting unit for detecting whether the limit crank angle position has been reached while fuel is being injected, and generating a detection signal; and a fuel injection stopping unit, upon receipt of the detection signal, for immediately stopping injection process prior to the elapse the injection period.

In a preferred embodiment of the present invention, the limit crank angle position for the immediate stopping of the injection process for each cylinder is determined after injection has been initiated for the cylinder.

In order to achieve the above object, there is provided a fuel injection control method in a direct injection type gasoline internal combustion engine, comprising the steps of: setting the period of fuel injection and the start-up timing of injection of a fuel injection valve according to the operational conditions of an engine; setting a crank angle before ignition as a limit crank angle position to compulsively stop the fuel injection of the fuel injection valve; detecting the set limit crank angle position, for each cylinder; and compulsively stopping, when the limit crank angle position is detected, the fuel injection of the fuel injection valve of the corresponding cylinder.

The nature, principle and utility of the invention will become more apparent from the following detailed description when read in conjunction with the accompanying drawings.

DESCRIPTION OF THE PREFERRED EMBODIMENTS

The embodiments of the present invention will be described below.

Figure 1:
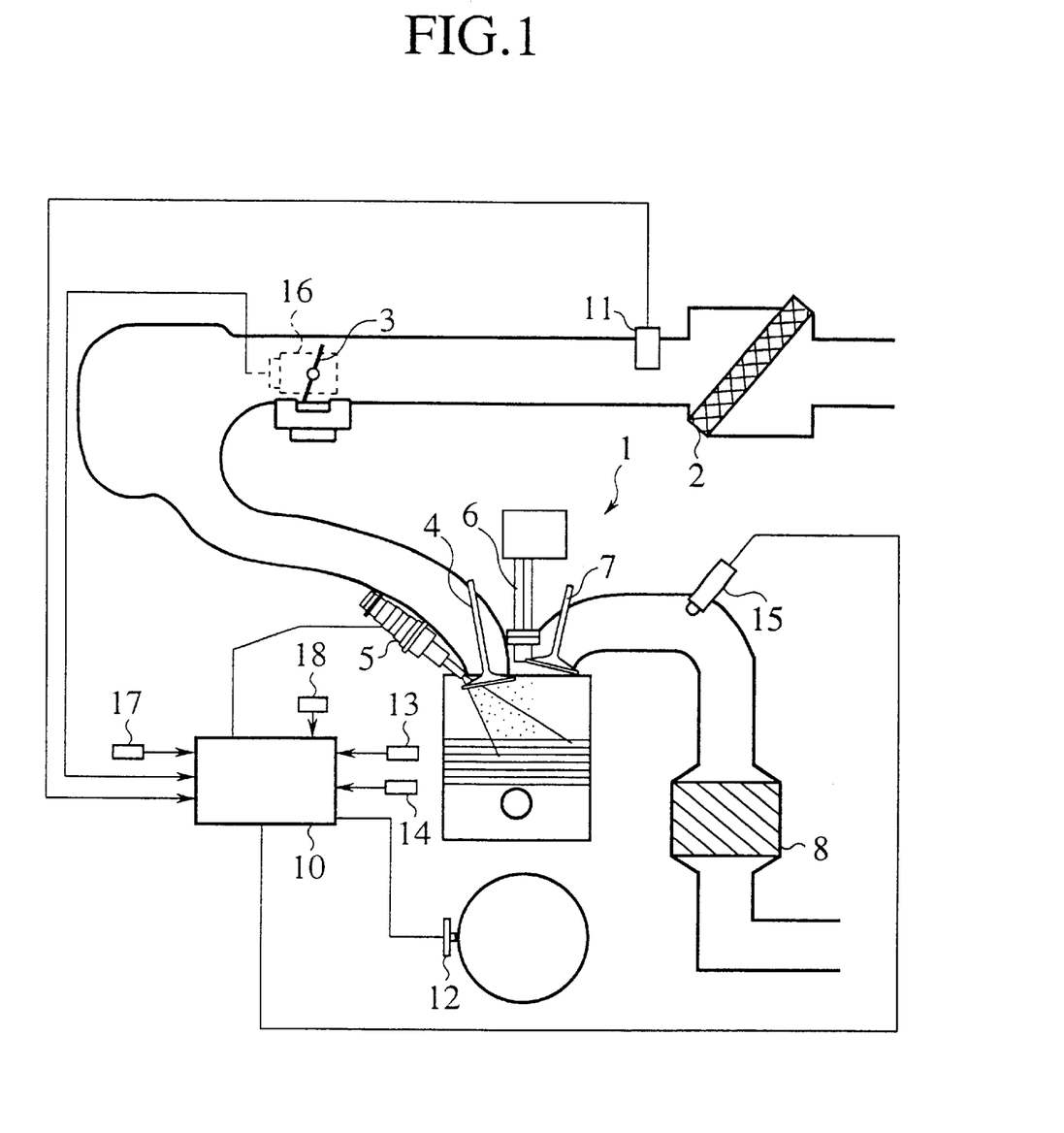
FIG. 1 is a view of system arrangement showing an injection control system of an internal combustion engine in an embodiment of the present invention.

FIG. 1 is a view showing system arrangement of a direct injection type gasoline internal combustion engine in the embodiments. In an engine 1, it is arranged that the air passed through an air cleaner 2 is controlled by a throttle valve 3 and is sucked into a cylinder through an intake valve 4.

In each cylinder, an electromagnetic type fuel injection valve 5 directly injecting fuel into a combustion chamber is provided. Air-fuel mixture is formed in a cylinder with the fuel injected from the fuel injection valve 5.

The air-fuel mixture in a cylinder is ignited to burn with spark ignition of a spark plug 6. The burnt exhaust gas is discharged through an exhaust valve 7 and is purified in a catalyst 8 and is emitted into atmosphere.

Figure 2:
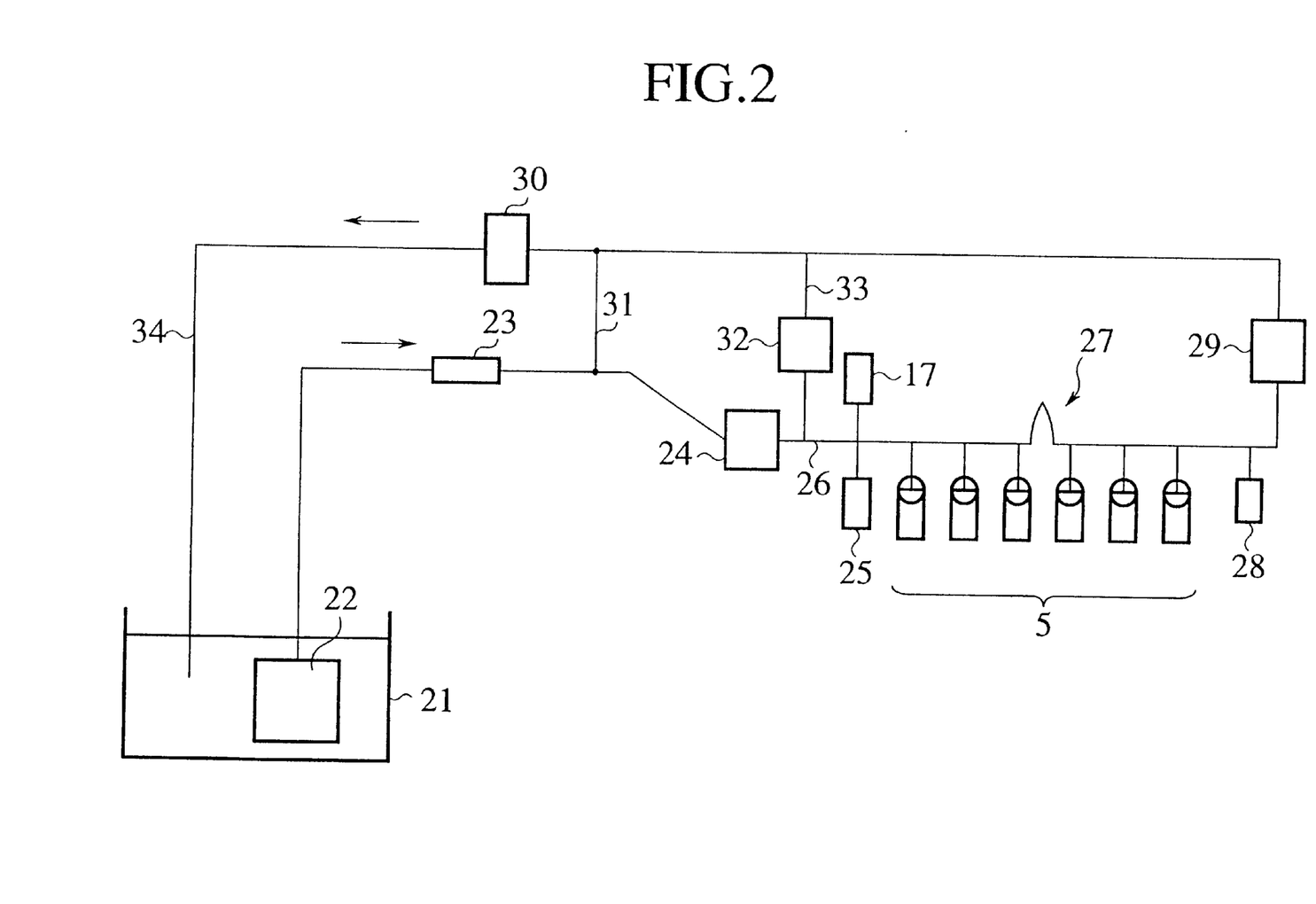
FIG. 2 is a view of system arrangement showing a fuel supply system of an internal combustion engine in an embodiment of the present invention.

To the fuel injection valve 5, fuel is supplied by a fuel supply system shown in FIG. 2.

In FIG. 2, fuel in a fuel tank 21 is sucked by an electrically powered low pressure fuel pump 22, and is supplied to an engine drive high pressure fuel pump 24 through a fuel filter 23.

The high pressure fuel sent by pressure from the high pressure fuel pump 24, is sent to a fuel gallery 27 through fuel piping 26 in which an accumulator 25 is located, and is supplied to each fuel injection valve 5 attached to the fuel gallery 27.

On the downstream side of the fuel gallery 27, a high pressure regulator 29 is connected through an accumulator 28. The high pressure regulator 29 adjusts the pressure of the fuel supplied to the fuel injection valve 5 to a specified high pressure.

The surplus fuel from the high pressure regulator 29 is arranged to be sent to a low pressure regulator 30. Further, the upstream side of the high pressure fuel pump 24 and the upstream side of the low pressure regulator 30 communicate with each other through a communicating tube 31. Accordingly, the pressure in the surplus fuel system of the high pressure regulator 29 and the supply system from the low pressure fuel pump 22 to the high pressure fuel pump 24, are adjusted to a specified pressure in the low pressure regulator 30.

The surplus fuel from the low pressure regulator 30 is returned to the fuel tank 21 through return piping 34.

Furthermore, a communicating tube 33 is provided, which connects the downstream side of the high pressure fuel pump 24 and a position between the high pressure regulator 29 and the low pressure regulator 30, through a safety valve 32, so that abnormal high pressure can be relieved by opening the safety valve 32.

The fuel injection valve 5 to which fuel is supplied with the above structure, is controlled to be energized with a pulse signal of injection from a control unit 10 (injection control means) containing a microcomputer. Signals from various sensors are inputted into the control unit 10 to determine the pulse width (period of injection) and the output timing (start-up timing of injection) of the pulse signal of injection.

As the various sensors, the following sensors are provided: an air flow meter 11 detecting the intake air flow rate Q of the engine 1; a position sensor 12 outputting a detection signal for every unit crank angle; a reference sensor 13 outputting a reference signal each time a reference crank angle position of each cylinder is detected; a phase sensor 14 outputting a phase signal which indicates, as a number of pulse, the cylinder corresponding to the next reference signal between reference signals from the reference sensor 13; an air-fuel ratio sensor 15 detecting the air-fuel ratio of burnt air-fuel mixture in response to the oxygen concentration in the exhaust gas; a throttle sensor 16 detecting the opening TVO of the throttle valve 3; a fuel pressure sensor 17 detecting the pressure of the fuel supplied to the fuel injection valve 5 on the downstream side of the high pressure fuel pump 24; a water temperature sensor 18 detecting the temperature Tw of the cooling water of the engine 1; and the like.

Here, by measuring the frequency of occurrence of reference signals from the reference sensor 13 or the number of occurrence of position signals from the position sensor 12 in a specified length of time, the rotational speed Ne of the engine can be found.

In the present example, the water temperature detected by the water temperature sensor 18 is used as a value representing the temperature of the engine.

The control unit 10 determines the start-up timing of injection and the period of injection (pulse width of injection) on the basis of the data such as water temperature, load of the engine, and rotational speed of the engine.

The load of the engine is represented by the intake air quantity of a cylinder (=Q/Ne), but the basic pulse width of injection set in proportion to the intake air quantity of a cylinder may also be used as a parameter representing the load of the engine.

Here, a mode in which fuel is diffused by injecting fuel during an intake stroke and uniform air-fuel mixture is formed in a cylinder so as to perform uniform combustion, and a mode in which by performing injection during a compression stroke, stratified charge is performed and thick air-fuel mixture is formed around the spark plug 6 so as to perform stratified combustion, are arranged to be switched and to be set. For example, at low water temperature and at high water temperature, a mode of uniform combustion is to be selected.

Moreover, the feedback control to correct the period of injection is arranged to be performed on the basis of the fuel pressure detected by the fuel pressure sensor 17.

Figure 3:
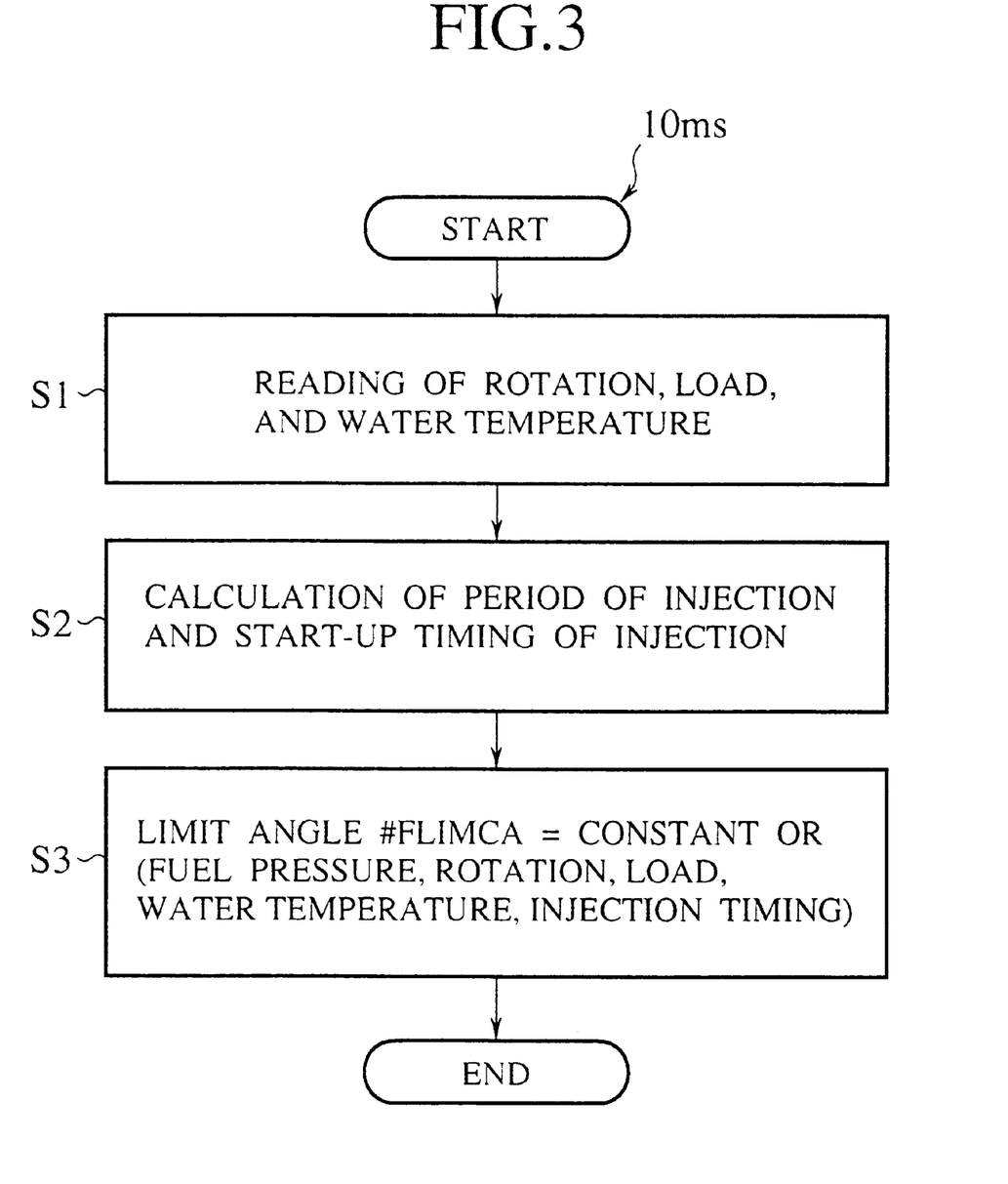
FIG. 3 is a flow chart showing arithmetic processing of injection control parameters in an embodiment of the present invention.
Figure 4:
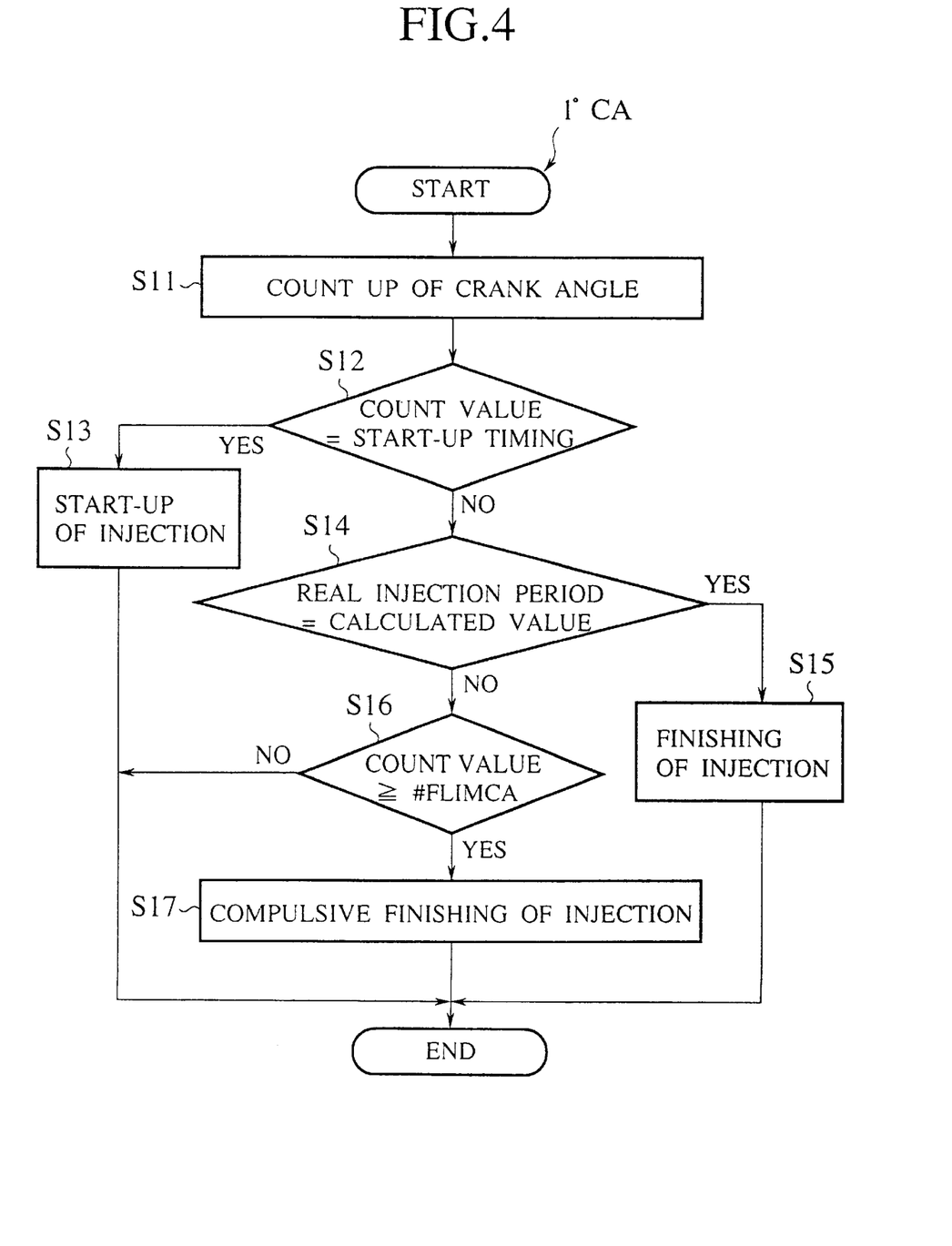
FIG. 4 is a flow chart showing processing of injection control in an embodiment of the present invention.

Flow charts of FIG. 3 and FIG. 4 show the flow of injection control of the control unit 10. It should be noted that the processing shown in FIG. 3 is a processing executed every 10 ms and the processing shown in FIG. 4 is a processing executed every unit crank angle (that is, 1°).

In the flow chart in FIG. 3, first, at step S1, various detected results such as rotational speed Ne of an engine, load, water temperature Tw, are read in.

At step S2, the period of injection (pulse width of injection) and the start-up timing of injection are calculated.

Furthermore, at step S3 (limit crank angle position setting means), a crank angle position where the injection is compulsively stopped (hereafter referred to as the limit crank angle position), is calculated.

The above compulsive stopping of injection means that in a case where injection is still continued at the moment the limit crank angle position is reached, the drive to open the fuel injection valve 5 is stopped at the moment, even if the required period of injection is not passed, and any injection is not performed until the next timing of injection comes.

The limit crank angle position is set to be during a compression stroke and before ignition. By avoiding the continuation of injection beyond the limit crank angle position, occurrence of a back flow at the fuel injection valve caused by the drive to open the fuel injection valve in a state where the pressure in a cylinder is higher than the fuel pressure, is previously prevented.

That is, during a compression stroke, if the pressure in a cylinder gradually rises and the injection finishes before the pressure in a cylinder exceeds the fuel pressure, there is no problem. However, if the finishing of injection is delayed and slips into the moment the pressure in a cylinder exceeds the fuel pressure, there is a possibility that a back flow occurs at the fuel injection valve driven to open. Therefore, in order to compulsively finish the fuel injection before the pressure in a cylinder exceeds the fuel pressure, the latest moment of finishing of injection is specified by the limit crank angle position. Accordingly, the limit crank angle position is set at a moment before the pressure in a cylinder exceeds the fuel pressure.

The limit crank angle position is given as the count number #FLIMCA of position signals since the detection of the reference signal, and as described later, it may be a fixed value, and may also be arranged to be set variable according to operational conditions. As the operational conditions, parameters such as fuel pressure, rotational speed, load, water temperature, start-up timing of injection, are used.

The flow chart of FIG. 4 shows the control to stop the injection on the basis of the limit crank angle position.

At step S11, the count of position signals based on the reference signal, is performed.

At step S12, whether the count number is a value corresponding to the start-up timing of injection or not, is judged. Then at the moment the start-up timing of injection is detected, the process goes to step S13 so as to start fuel injection (start energizing of the fuel injection valve).

At step S14, whether the elapsed actual period of injection agrees with the calculated value of the period of injection or not, is judged, and if the given period of injection is passed, the process goes to step S15 so as to finish the injection (to shut off energizing of the fuel injection valve).

Furthermore, at step S16 (limit crank angle position detecting means), by judging whether the count number of the position signals is equal to or more than the value #FLIMCA corresponding to the limit crank angle position, or not, detection of the limit crank angle position is performed.

If the limit crank angle position is reached, the process goes to step S17 (fuel injection stopping means) and energizing of the fuel injection valve is compulsively stopped so as to compulsively finish the injection.

Consequently, if the limit crank angle position is reached before the actual period of injection becomes the calculated value, injection is stopped without injecting the required fuel quantity. Accordingly, such a situation that the pressure in a cylinder exceeds the fuel pressure because the injection (energizing of the injection valve) is continued beyond the limit crank angle position and that a back flow occurs, can be avoided.

The calculation of the limit crank angle position in step S3, can be arranged to set a previously stored fixed value.

That is, if the fuel pressure supplied to the fuel injection valve 5 is taken as a nearly constant pressure, the limit crank angle position can be determined only by the pressure in a cylinder. The pressure in a cylinder changes with the load and the rotation, but if its characteristics are fitted to the characteristics of the pressure in a cylinder under conditions where there is a high possibility that the crank angle position of the finishing of injection is largely delayed, for example, a condition of a start-up at low temperature or the like, the limit crank angle position can be given as a fixed value.

On the other hand, the calculation of the limit crank angle position at step S3 may be arranged to be set variable according to the fuel pressure detected by the fuel pressure sensor 17.

That is, at high fuel pressure, even if injection is permitted until a later moment during a compression stroke, the pressure in a cylinder does not exceed the fuel pressure and no back flow occurs, but at low fuel pressure, injection should be stopped at an earlier moment, otherwise the pressure in a cylinder exceeds the fuel pressure and a back flow occurs.

Therefore, when the fuel pressure detected by the fuel pressure sensor 17 is lower, the limit crank angle position should be more advanced from compression top dead center so that compulsive stopping of injection may be performed at an earlier moment.

Furthermore, the limit crank angle position at step S3 may be arranged to be set variable according to the water temperature detected by the water temperature sensor 18.

That is, since a possibility that the crank angle position of the finishing of injection is largely delayed, becomes high in a start-up at low temperature, the limit crank angle position is advanced at low water temperature, and by the control of stopping of injection with the limit crank angle position, the control of injecting in a state where the pressure in a cylinder is higher than the fuel pressure, is surely avoided. On the other hand, after warming up, the limit crank angle position is comparatively delayed so that unnecessary limiting of injection period may be avoided.

Furthermore, it may also be arranged that by judging the state of the start-up of an engine together with the condition of water temperature, the limit crank angle position is advanced only at low water temperature and during a start-up.

In addition, although the limit angle #FLIMCA is calculated periodically (i.e. every 10 milliseconds) and concurrently with injection period and start-up timing (FIG. 3), the limit crank angle #FLIMCA utilized at step S16, FIG. 4 may be based on a later or updated value which is in place after the fuel injection period as well as injection start-up timing controls have taken place and have been used at step S12, FIG. 4. This arrangement thus allows the value for #FLIMCA to reflect on an updated or latest change in condition such as an engine rotational speed, a fuel pressure, which subsequently undergo a change after the injection start-up has been initiated at step S12. For example, it is now possible to adjust the injection interrupt or stop timing with respect to a specific cylinder by taking into consideration of a rotational speed change of the engine after the injection start-up of that cylinder. This compulsory or immediate injection stopping of the injection process is particularly an effective method where a relatively extended or prolonged period of injection is required such as in a cold start engine operation and, in addition, an engine speed has been increased suddenly from the value based on which the original injection period and start-up timing has been calculated and put into operation.

Moreover, it may also be arranged that the limit crank angle position at step S3 is made to be corresponding to the load of the engine and the rotational speed of the engine correlative to the pressure in a cylinder, and the limit crank angle position is changed according to the change of the pressure in a cylinder caused by the difference in operational conditions. That is, under such operational conditions that the pressure in a cylinder becomes high, the limit crank angle position should be advanced, and under such operational conditions that the pressure in a cylinder becomes low, the limit crank angle position should be delayed.

Furthermore, in a case where the start-up timing of injection is arranged to be switched to either a timing during an intake stroke or a timing during a compression stroke according to the operational conditions of the engine, the limit crank angle position should be switched and be set according to whether the start-up timing of injection is during an intake stroke or during a compression stroke.

In a case where the start-up timing of injection is during a compression stroke (stratified combustion mode), if the limit crank angle position is set with a comparatively large margin (if the limit crank angle position is set at a comparatively early moment), ensuring of the necessary injection quantity may become difficult. On the other hand, in a case where the start-up timing of injection is during an intake stroke (uniform combustion mode), since the start-up moment of injection is early, the injection quantity can be ensured even if the limit crank angle position is set with a comparatively large margin.

Therefore, in a case where the start-up timing of injection is during a compression stroke, a crank angle position where the pressure in a cylinder is comparatively high, is made to be the limit crank angle position so that the injection in a state where the pressure in a cylinder largely exceeds the fuel pressure, may be avoided while ensuring the injection quantity. On the other hand, in a case where the start-up timing of injection is during an intake stroke, a crank angle position where the pressure in a cylinder is comparatively low, is set as the limit crank angle position so that the injection in a state where the pressure in a cylinder is higher than the fuel pressure, may surely be avoided.

Figure 5:
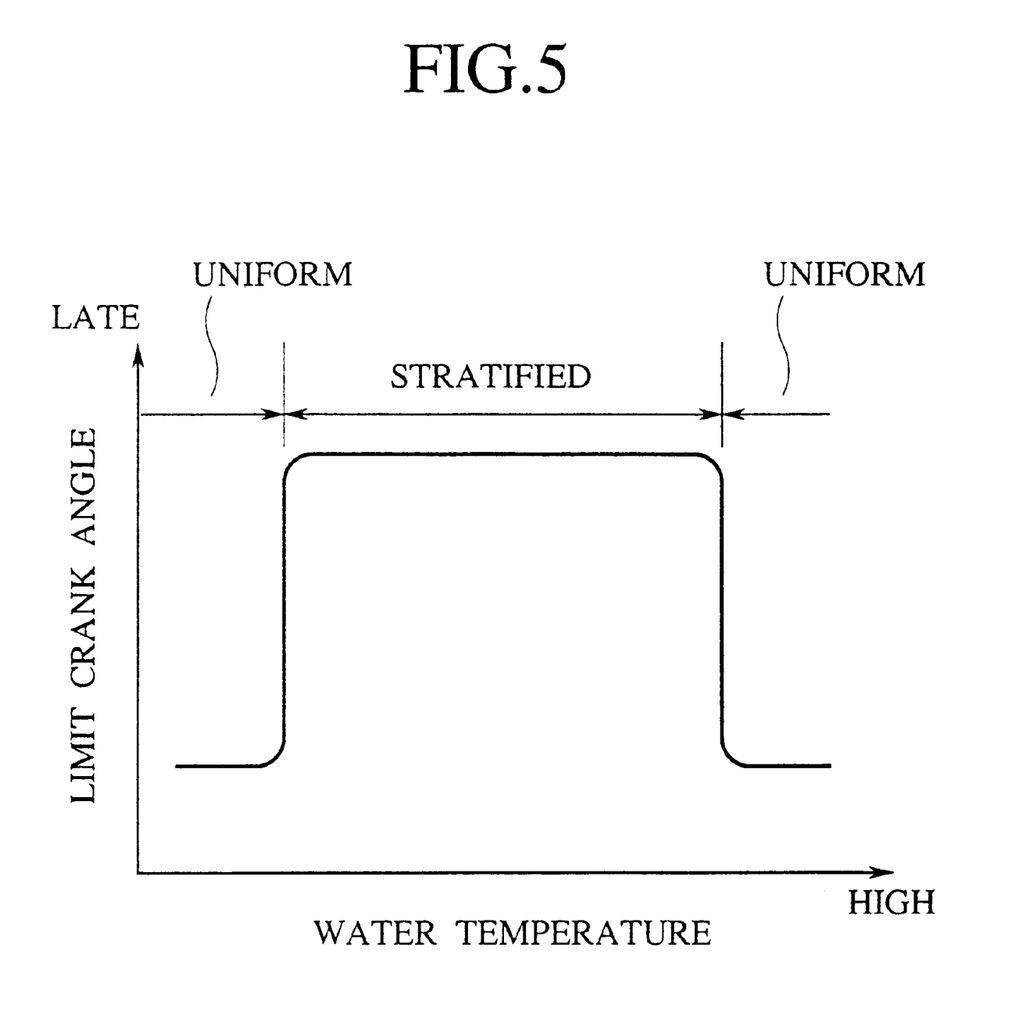
FIG. 5 is a diagram showing correlation between the water temperature and the limit crank angle position.

Furthermore, in a case where switching and setting of the start-up timing of injection are performed according to the water temperature, it may also be arranged that the limit crank angle position is switched and set according the water temperature, and that, as a result, the limit crank angle position according to the start-up timing of injection is set (see FIG. 5). Similarly, in a case where the start-up timing of injection is switched according to the load of the engine and the rotation of the engine, it can also be arranged that the limit crank angle position is switched and set according to the load of the engine and the rotation of the engine, and that, as a result, the limit crank angle position according to the start-up timing of injection is set.

The above parameters (fuel pressure, load of an engine, rotational speed of an engine, water temperature, start-up timing of injection) for setting the limit crank angle position, may respectively independently be used, and it may also be arranged that a plurality of parameters are combined so as to set the limit crank angle position.

The processing shown in FIG. 3 is performed for each cylinder.

It should be understood that many modifications and adaptations of the invention will become apparent to those skilled in the art and it is intended to encompass such obvious modifications and changes in the scope of the claims appended hereto.

What is claimed is:

1. A fuel injection control system in a direct injection type gasoline internal combustion engine, comprising:

a fuel injection valve for directly injecting fuel into a combustion chamber of a cylinder;

a fuel injection control means for determining a period of fuel injection and start-up timing of injection of the fuel injection valve according to operational conditions of an engine and for subsequently controlling the injection of fuel by said fuel injection valve based on the determined period and the start-up timing;

a limiting crank angle position setting means for setting a limited crank angle beyond which the pressure in the cylinder is calculated to exceed the pressure of fuel supplied;

a limiting crank angle position detecting means for detecting said limiting crank angle position set by the limiting crank angle position setting means; and a fuel injection stopping means which compulsively stops, when a limiting crank angle position is detected by the limiting crank angle position detecting means, fuel injection of said fuel injection valve prior to the end of the determined fuel injection period.

2. A fuel injection control system in a direct injection type gasoline internal combustion engine described in claim 1, wherein said limit crank angle position setting means sets a constant value as said limit crank angle position.

3. A fuel injection control system in a direct injection type gasoline internal combustion engine described in claim 2, wherein said limit crank angle position setting means sets an angle of 40° to 80° before top dead center as said constant value.

4. A fuel injection control system in a direct injection type gasoline internal combustion engine described in claim 1, wherein said limit crank angle position setting means sets said limit crank angle position to be variable according to pressure of fuel supplied to said fuel injection valve.

5. A fuel injection control system in a direct injection type gasoline internal combustion engine described in claim 1, wherein said limit crank angle position setting means sets said limit crank angle position to be variable according to temperature of an engine.

6. A fuel injection control system in a direct injection type gasoline internal combustion engine described in claim 1, wherein said limit crank angle position setting means the said limit crank angle position to be variable according to a load of an engine and rotational speed of an engine.

7. A fuel injection control system in a direct injection type gasoline internal combustion engine described in claim 1, wherein said injection control means switches said start-up timing of injection of said fuel injection valve to either a timing during an intake stroke or a timing during a compression stroke according to operational conditions of an engine, and wherein said limit crank angle position setting means switches and sets said limit crank angle position according to whether said start-up timing of injection is during an intake stroke or during a compression stroke.

8. A fuel injection control system for a multi-cylinder internal combustion engine of direct injection type, comprising:
- a fuel injection valve disposed in a combustion chamber of each engine cylinder;
- a sensor for generating an engine operating condition indicative signal;
- a control unit, responsive to the sensor signal, for calculating a period of injection and a start-up timing thereof and for controlling the injection valve based on the calculated injection period and start-up timing;
- a limiting crank angle position setting unit for setting a limiting crank angle position beyond which the pressure in a cylinder is calculated to exceed the pressure of fuel supplied to the respective injection valve;
- a limiting crank angle position detecting unit for detecting whether the limiting crank angle position has been reached while fuel is being injected, and generating a detection signal; and
- a fuel injection stopping unit, upon receipt of the detection signal, for immediately stopping the injection process prior to the elapse of the injection period.

9. A fuel injection control system as recited in claimed 7, wherein the limit crank angle position is set for each cylinder so that the fuel injection stopping operation is performed independently for each cylinder.

10. A fuel injection control system as recited in claimed 9, wherein the sensor is an engine speed detecting sensor.

11. A fuel injection control system as recited in claimed 10, wherein the limit crank angle is calculated for each cylinder after the fuel injection period and start-up timing control has been put in operation for the cylinder.

12. A fuel injection control system for a multi-cylinder internal combustion engine of direct injection type, comprising:
- a fuel injection valve disposed in a combustion chamber of each engine cylinder;
- a sensor for generating an engine operating condition indicative signal;
- a control unit, responsive to the sensor signal, for calculating a period of injection and a start-up timing thereof relative to a reference position with respect to each cylinder and controlling the injection valve according to the calculated injection period and start-up timing for each cylinder;
- a limit crank angle position setting unit for setting a limit crank angle position at which the fuel injection is stopped;
- a limit crank angle position detecting unit for detecting whether the limit crank angle position has been reached while fuel is being injected, and generating a detection signal; and
- a fuel injection stopping unit, upon receipt of the detection signal, for immediately stopping injection process prior to the elapse the injection period.

13. A fuel injection control system as recited in claim 12, wherein the limit crank angle position for the immediate stopping of the injection process for each cylinder is determined after injection has been initiated for the cylinder.

14. A method for controlling fuel injection in a direct injection type gasoline internal combustion engine, comprising the steps of:
- setting period of fuel injection and start-up timing of injection of a fuel injection valve according to operational conditions of an engine;
- setting a crank angle before ignition as a limit crank angle position to compulsively stop fuel injection of said fuel injection valve;
- detecting said set limit crank angle position, for each cylinder; and
- compulsively stopping, when said limit crank angle position is detected, fuel injection of said fuel injection valve of the corresponding cylinder.

15. A fuel injection control system in a direct injection type gasoline internal combustion engine, comprising:
- a fuel injection valve for directly injecting fuel into a combustion chamber of an engine cylinder:
- a sensor for sensing an operational condition of the engine; and
- an injection control unit operatively connected to the fuel injection valve and the sensor, to determine a fuel injection period and injection initiation timing of fuel injection according to the sensed operational conditions of the engine, wherein the control unit controls the fuel injection valve in accordance with the determined injection period and startup timing, and wherein the control unit compulsively terminates the fuel injection by the fuel injection valve when, during the determined injection period after the start-up timing, a predetermined crank angle is reached irrespective of whether the determined injection period has elapsed.

16. A method of controlling direct injection of a gasoline internal combustion engine comprising the steps of:
- monitoring engine load;
- monitoring crank angle;
- determining injection duration and initiation timing;
- predicting, based on engine load, the crank angle at which the pressure in the combustion chamber, during a compression phase, will exceed fuel injection pressure injection pressure; and
- prematurely terminating injection prior the end of the determined injection period when the injection period terminates after the predicted crank angle.

17. A fuel injection control system in a direct injection type gasoline internal combustion engine, comprising:
- means for monitoring engine load;
- means for monitoring crank angle;
- means for determining injection duration and initiation timing;
- means for predicting, based on engine load, the crank angle at which the pressure in the combustion chamber, during a compression phase, will exceed fuel injection pressure injection pressure; and
- means for prematurely terminating injection prior the end of the determined injection period when the injection period terminates after the predicted crank angle.

* * * * *